(No Model.)
P. MARQUA.
DEVICE FOR SUSPENDING CARRIAGE TOPS.
No. 293,897. Patented Feb. 19, 1884.
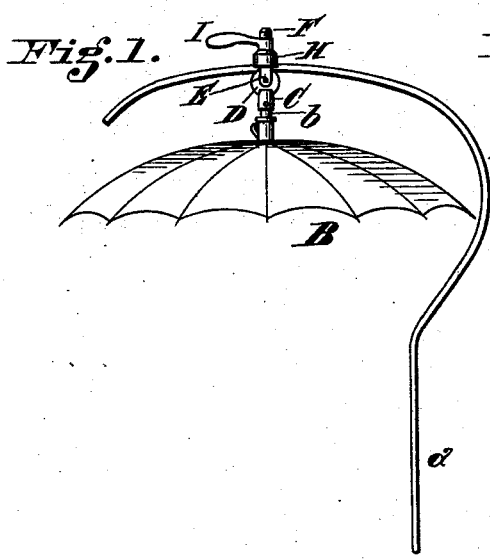
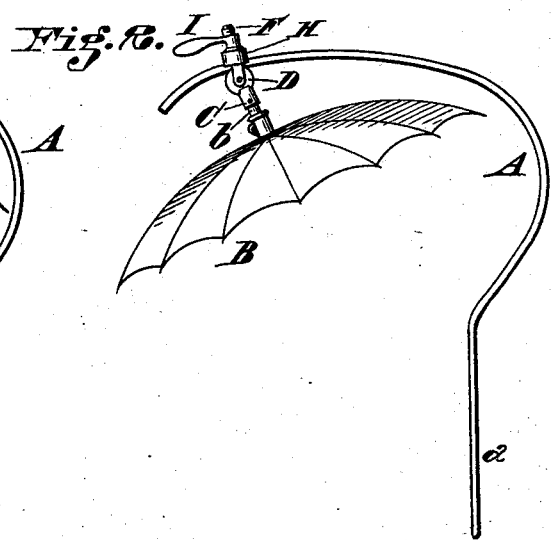
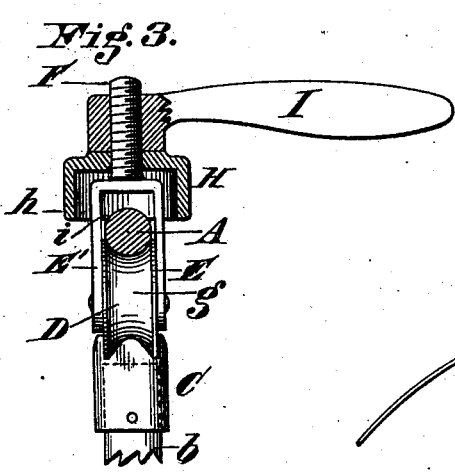
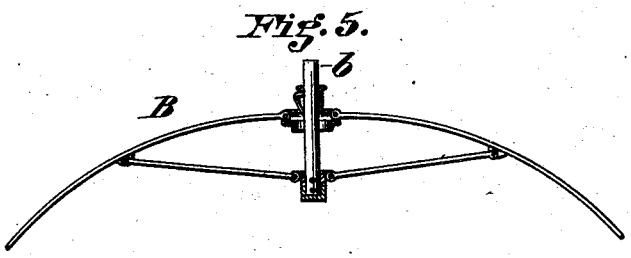
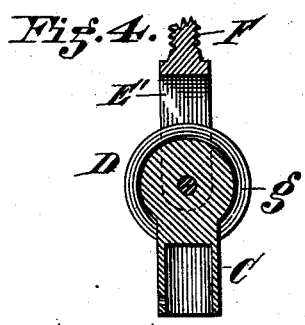
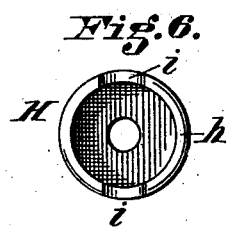
Attest
Jno. L. Jones
N. Gluchowsky
Inventor
Philip Marqua,
by Wood & Boyd
his Attorneys

UNITED STATES PATENT OFFICE.

PHILIP MARQUA, OF CINCINNATI, OHIO.

DEVICE FOR SUSPENDING CARRIAGE-TOPS.

SPECIFICATION forming part of Letters Patent No. 293,897, dated February 19, 1884.

Application filed December 18, 1883. (No model.)

*To all whom it may concern:*

Be it known that I, PHILIP MARQUA, a citizen of the United States, residing at Cincinnati, in the county of Hamilton and State of Ohio, have invented certain new and useful Improvements in Devices for Suspending Carriage-Tops, of which the following is a specification.

My invention relates to the suspending of parasol, umbrella, or other carriage tops or canopies, preferably supported on an overhanging arm attached to the carriage-body.

The object of my invention is to provide a suitable means for suspending the top so that it can be set at any angle of inclination to its axis of support, and readily moved out of the way when folded, all of which will be fully set forth in the description of the accompanying drawings, in which—

Figure 1 is an elevation showing my invention in position for use. Fig. 2 is a similar view of my invention, showing a different angle of adjustment of the top. Fig. 3 is a central section, partly in elevation, of my suspending device. Fig. 4 is a central transverse section of the lower portion of Fig. 3. Fig. 5 is a central vertical section of the top shown in Figs. 1 and 2. Fig. 6 is a bottom plan view of the compression-ring.

A represents a bent arm, the shank of which is usually attached to the rear of the carriage-seat, for suspending the top over the occupant.

B represents a parasol, the top $b$ of which is fastened into a metal socket, C, the shank of which socket extends upward and terminates in a grooved block, D. These parts C and D are preferably made of metal cast in one piece.

E E' represent forked arms of a screw-bolt, F, for securing the hanger-socket C in position.

H represents a socket-washer pierced for the shank of bolt F.

$h$ represents an annular flange, which is pressed down by the screw-arm I, so as to compress the rod A between the groove $g$ and the flange $h$, for securing the socket at any desired angle of adjustment or deflection.

$i\ i$ represent grooves formed on flange $h$, so as to have it fit the arm A.

The groove $g$ being circumferentially around the block D allows the shank or socket C to be tilted forward or backward, so as to incline or set the stem of the parasol to any angle to the horizon desired with reference to the frame and rear of the seat, and the circular shape of groove $g$ in a vertical plane, together with the shape of rod A, allows a similar lateral deflection at right angle to the first-named inclination.

The shape of the block D, together with the groove $g$, rod A, and clamp-washer H, constitutes, in effect, a universal joint, which can be secured at any angle of adjustment.

When the clamp H is released and the parasol or top B is folded, the whole device can be carried backward on the arm A and allowed to hang down at the side shank, $a$, or removed entirely.

I do not desire to limit myself to the use of the particular clamping devices, as they may be variously modified. So, too, other modes of attaching the parasol to the hanger-shaft may be employed, the principal feature of my invention being the arc-groove $g$, adapted to fit the suspension-rod and move in the two reverse circular paths for universal adjustment of the top.

I claim—

1. A device for suspending a parasol or top, composed of the block D, groove $g$, and clamp H and screws F and I, substantially as herein set forth.

2. In combination with the grooved block D and clamp H, I, and F, the parasol B, secured thereto, substantially as herein set forth.

3. In combination with the grooved block D and clamp H, I, and F, the rod A, adapted to suspend the same over a carriage-seat, substantially as herein set forth.

4. A supporting device consisting of the grooved arc-block D, adapted to fit the supporting-rod A, and to be moved in the two right-angle circular paths, in combination with clamping mechanism for securing it in any fixed position, substantially as herein set forth.

In testimony whereof I have hereunto set my hand.

PHILIP MARQUA.

Witnesses:
 JNO. E. JONES,
 A. GLUCHOWSKY.